Patented Jan. 25, 1927.

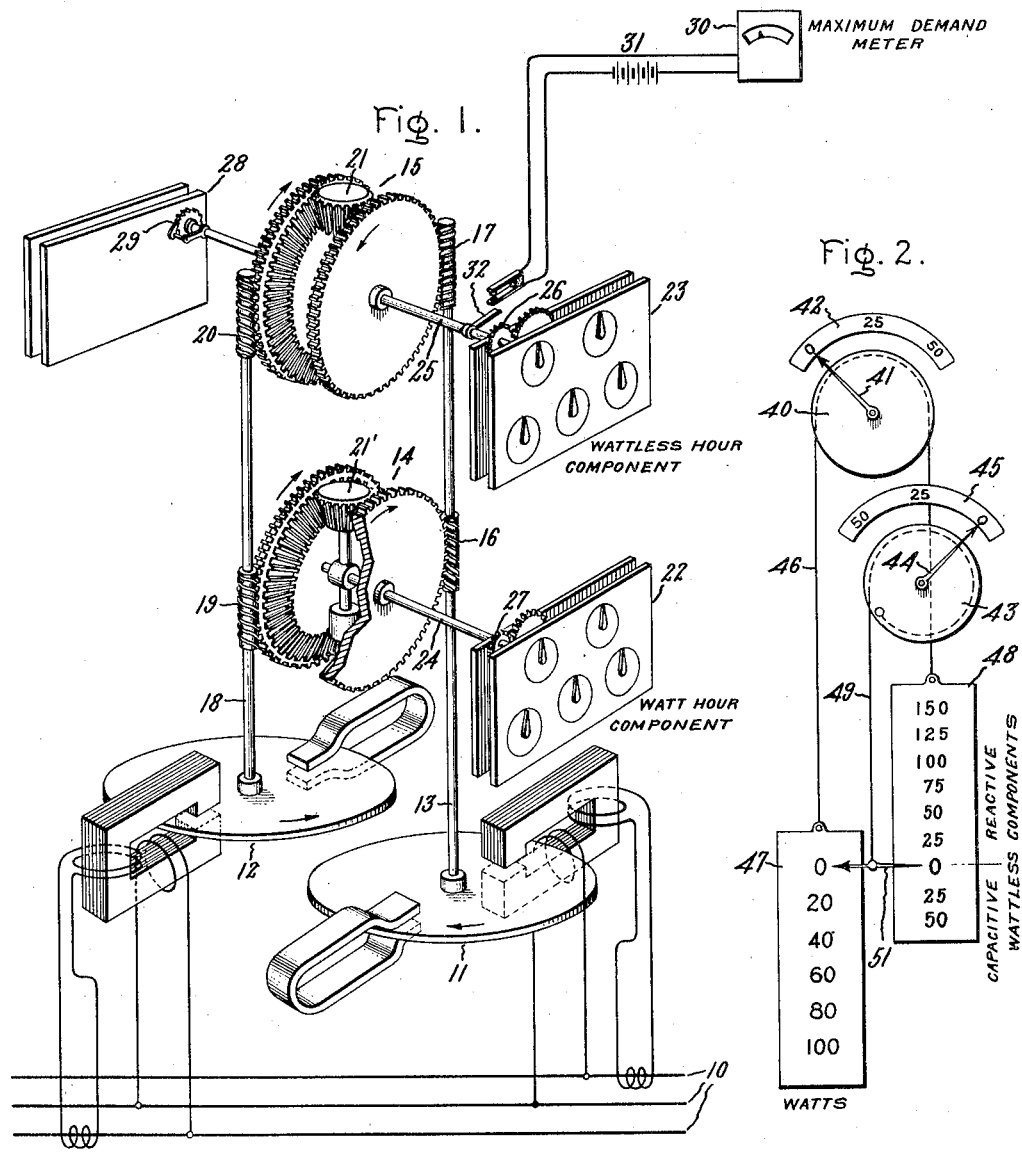

1,615,731

UNITED STATES PATENT OFFICE.

RUSSELL A. WARNER, OF SCHENECTADY, NEW YORK, ASSIGNOR TO GENERAL ELECTRIC COMPANY, A CORPORATION OF NEW YORK.

ELECTRIC METER.

Application filed September 7, 1923. Serial No. 661,481.

My invention relates to electric meters and in particular to a simple instrument for simultaneously measuring both the watt and the wattless component of a polyphase alternating current circuit.

In recent years it has been recognized that a consumer who takes electric energy at a low lagging power factor should be charged more than the consumer who draws the same amount of energy at a good power factor or at a leading power factor. The latter is true since under present conditions the consumer who takes energy at a leading power factor produces a corrective effect on the system which compensates for the more common lagging power factor load. The adoption of an additional charge or penalty for low power factor loads has not been very attractive due largely to the expense of the additional metering equipment necessary. For this purpose it has heretofore been necessary to provide in addition to the usual watt-hour-meter, a power factor instrument or a wattless component measuring instrument.

The primary object of my invention is to provide a single instrument of simple construction, of either the integrating or indicating type, which will measure both the watt component and the wattless component of a polyphase alternating current circuit. A further object of my invention is to provide such an instrument which will automatically distinguish between energy taken at a leading power factor from that taken at a lagging power factor and if desired credit the customer for the former. Other advantages of my improved instrument will appear as the description proceeds.

My invention will be described as applied to a 3 phase alternating current circuit and, as thus applied, I carry my invention into effect by using two ordinary single phase wattmeter elements, connect them according to the well known two-watt meter method of measurement to a three-phase circuit and provide means for automatically adding their measurements together to obtain a quantity which is equal to or proportional to the true watts, and other means for automatically substracting their measurements to obtain a quantity which is proportional to or equal to the wattless component and for automatically multiplying one of these quantities by the necessary constant to obtain the true relative values of the two components.

The features of my invention which I believe to be novel and patentable will be pointed out in the claims appended hereto. For a better understanding of my invention, reference is made, in the following description, to the accompanying drawing in which Fig. 1 represents my invention applied to an instrument of the integrating type, and in Fig. 2 its application to an instrument of the indicating type. Fig. 3 represents a modified electrical connection for the instruments to be referred to.

If two single phase wattmeters are connected to a balanced three-phase line in the manner indicated in Fig. 1, one meter will measure $P_1 = EI \cos(30 + \phi)$ and the other will measure $P_2 = EI \cos(30 - \phi)$ where E is the line voltage, I the line current and $\cos \phi$ the power factor.

$$P_1 + P_2 \sqrt{3} = EI \cos \phi \tag{I}$$

$$\begin{aligned} P_2 - P_1 &= EI \{(\cos(30-\phi) - \cos(30+\phi)\} \\ &= EI \{ \tfrac{1}{2}\sqrt{3} \cos \phi + \tfrac{1}{2} \sin \phi - \tfrac{1}{2}\sqrt{3} \cos \phi + \tfrac{1}{2} \sin \phi \} \\ &= EI \sin \phi \end{aligned} \tag{II}$$

(For the derivation of these equations, see pages 111 to 112 of "Alternating Current Machines", 8th edition, edited by Sheldon, Mason & Hausmann, published by the D. Van Nostrand Company in 1909.)

Equation (I) represents the total power and equation (II) represents a quantity which, if multiplied by $\sqrt{3}$ gives the total wattless component. Thus the problem of obtaining both these quantities by a single instrument consists in providing means for automatically adding the wattmeter readings to obtain the power component and providing means for automatically subtracting the wattmeter readings and multiplying the result by $\sqrt{3}$ to obtain the wattless component.

In Fig. 1, I have shown apparatus for accomplishing these functions as applied to wattmeters of the integrating type. 10 indicates a balanced or substantially balanced three-phase alternating current circuit. 11 and 12 indicate single phase wattmeters of the integrating type connected to measure the energy represented by $P_1$ and $P_2$ respectively of equation (I) above. Shaft 13 of a meter 11 drives one side of differentials 14 and 15 through worm gears 16 and 17 respectively. The worms 16 and 17 are arranged to drive the two sides of the differentials in opposite directions as indicated by the arrows. Shafts 18 of meter 12 drives the other sides of differentials 14 and 15 through worm gears 19 and 20, which worms are arranged to drive their respective sides of the differentials in the same direction as indicated by the arrows. The central elements 21' and 21 of the differentials 14 and 15 are suitably balanced and arranged to drive registers 22 and 23 respectively through shafts 24 and 25. It will now be evident that for the directions of rotations shown for the two wattmeter elements, the lower differential will add the integration of the meter elements and register the same on 22, while the upper differential will subtract the integration of the meter elements and register the difference on 23. If now the gear relation between the meters and the registers 22 and 23 be made to have the ratio of $\frac{\sqrt{3}}{1}$ register 22 may be calibrated in watt hours and register 23 in wattless component hours. For this purpose, gear 26 in the upper gear train has been shown larger than gear 27 of the lower gear train. This relation might be incorporated in the differentials themselves, or, the gear relation leading to both registers might be made equal and the reading of register 23 multiplied by $\sqrt{3}$ to obtain the wattless component hours.

In order to obtain a clearer understanding of the operation of this instrument, let us assume that a balanced load of 10 amperes at 100 volts is flowing in line 10 and that the power factor varies according to the first column of the following table which gives the corresponding values indicated:

| Cos $\phi$ | Cos (30+$\phi$) | Cos (30−$\phi$) | $P_1$ | $P_2$ | $P_1+P_2$ | $P_2-P_1$ | $\sqrt{3}P_2-P_1$ |
|---|---|---|---|---|---|---|---|
| Lagging 1 | .866 | .866 | 866 | 866 | 1,732 | 0 | 0 |
| Lagging .94 | .643 | .985 | 643 | 985 | 1,628 | 342 | 593 |
| Lagging .766 | .342 | .985 | 342 | 985 | 1,327 | 643 | 1,113 |
| Lagging .5 | 0 | .866 | 0 | 866 | 866 | 866 | 1,500 |
| Lagging .1736 | −.342 | .643 | −342 | 643 | 301 | 984 | 1,705 |
| Lagging 0 | −.500 | .500 | −500 | 500 | 0 | 1,000 | 1,732 |
| Leading .94 | .985 | .643 | 985 | 643 | 1,628 | −342 | −593 |

For unity power factor both single phase meter elements 11 and 12 rotate at the same speed and should be connected to the line so as to rotate in the directions indicated in Fig. 1. Their rotations are added by differential 14 and registered at 22, while the central member of differential 15 remains stationary. For power factor .94, meter 11 rotates slower than meter 12 so that the difference in their rotative speeds multiplied by $\sqrt{3}$ is registered at 23, while their sum is registered at 22. At power factor .5, meter 11 does not rotate at all so that the sum and difference of the rotative movements of the meters are equal and shafts 24 and 25 are rotated at the same speeds by meter 12 alone. However, the rotation of shaft 25 is increased by the factor $\sqrt{3}$ so that its registration at 23 bears the correct relation to that of register 22 for the corresponding values of wattless and watt components at this power factor. As the power factor is decreased to .1736, meter 11 reverses its direction of rotation and becomes negative in value but rotates slower than meter 12. Register 22 then gives the algebraic sum of the meter rotations while register 23 gives the algebraic difference increased by $\sqrt{3}$ which values are respectively equal to the watt and wattless components. At zero power factor the two meter elements rotate at the same speeds, but meter 11 is negative so that no registration takes place at 22 and maximum registration occurs at 23. In the foregoing illustration the power factor may have been either leading or lagging without changing the numerical results. Assuming a lagging power factor, register 23 gives the true reactive watt hours.

Now, without changing any connections, let us assume a leading power factor of, say, .94. The directions of rotations of meters 11 and 12 will be the same as for a lagging power factor of .94, but meter 11 will now rotate faster than meter 12 in the relation of $\frac{985}{643}$ so that shaft 25 of the upper differential will now rotate in the reverse direction to that in which it rotated for a lagging power factor of .94, but at the same speed, assuming the same current and voltage as before, and will thus deduct from the total reactive component hour registration of register 23 the amount of capacity component hours and thus give the customer the credit for the beneficial effect produced on the generating system by a leading power factor, assuming as is usually the case, that the total wattless component load on the generating system is reactive.

Instead of deducting the capacity component hours from register 23, I may provide a separate register therefor as indicated at 28 and provide suitable ratchets such as indicated at 29, so that the total reactive component hours are registered on dial 23 and the capacity component hours at 29.

The maximum demand of any one or all of the various component measurements may be obtained in the usual manner. At 30 I have indicated a well known type of demand instrument with its notching-up circuit 31 arranged to be intermittently closed by an arm 32 on shaft 25 so as to register the maximum demand of the reactive component hours. The contacts controlled by arm 32 are arranged to be closed only when shaft 25 rotates in the direction for reactive component registration. The demand meter will of course be provided with a time controlled zero reset mechanism such for example as is shown in United States Patent No. 722,030 Mertz.

The apparatus here described gives accurate results only when the load on the three-phase circuit is balanced. Slight unbalancing may be disregarded but the error due to unbalance increases rapidly with the increase of unbalance so that this instrument should not ordinarily be used on anything but substantially balanced circuits. It should be noted however that if the instrument be connected in an unbalanced circuit, the unbalance of which is always in the same direction, the error produced in the registration may be made such as to increase the registration and thus inflict an additional penalty on the customer for unbalancing the system. For example, suppose if, in the above table for power factor .94, we assume the current in the phases metered by $P_1$ and $P_2$ are 9.5 and 10.5 amperes respectively, instead of 10 and 10, then $P_1 = EI' \cos(30+\phi) = 611$ and $P_2 = EI'' \cos(30-\phi) = 1034$ $$P_1 + P_2 = 1645$$
$$P_2 - P_1 = 423$$
$$\sqrt{3}(P_2 - P_1) = 731$$

so that the customer's meter readings although inaccurate are increased, requiring him to pay a penalty for unbalancing the circuit. This is as it should be since a customer who unbalances an otherwise balanced system, is as bad as one who draws power at a low power factor. Thus if the proper precautions are taken in connecting my improved instrument to an unbalanced three-phase circuit, the customer is charged both for low power factor loads and for unbalanced loads, and the charge increases as these factors increase. It will also be evident that if the unbalancing of the system is such as to make the error positive part of the time and negative part of the time, one error has a tendency to correct the other in the aggregate monthly reading, so that the instrument will be useful on a system where the unbalancing although appreciable, is such as to make the plus and minus meter errors cancel each other.

In Fig. 2 I have illustrated an indicating instrument built in accordance with my invention. The meter connections are not shown but they will be similar to that shown in Fig. 1 and the same theory applies. 40 represents a pulley and 41 a pointer which are secured to the shaft of one single phase indicating type wattmeter element. The pointer 41 may cooperate with a scale 42 which will be calibrated to indicate the value $EI \cos(30-\phi)$. 43, 44 and 45 indicate a pulley, pointer and scale similarly arranged for the second single phase indicating type wattmeter element. Scale 45 will be calibrated to indicate the value $EI \cos(30+\phi)$. The zero positions of the scales are reversed so that the upper meter pointer 41 deflects to the right and pointer 44 to the left from their respective zero positions. Pulley 40 carries a cord 46 upon the ends of which are attached balanced light rigid scale plates 47 and 48. Pulley 43 carries a cord 49 on the end of which is a light pointer 51 cooperating with both scale plates 47 and 48. The length and positions of the cords are adjusted so that when both instruments indicate zero, pointer 51 stands at the zero points respectively of suitable scales marked on plates 47 and 48. The scale on plate 47 is calibrated in watts in such relation to scales 42 and 45 that it gives the sum of the meter indications. Thus, for a full scale deflection of the upper meter, scale plate 47 will be raised halfway and pointer 51, remaining stationary, will register 50 on the scale of plate 47. For a full scale deflection on both instruments pointer 51 will be lowered and register 100 on the scale of plate 47. Scale plate 48 is calibrated in wattless component units so that the length of a scale division thereon is only $\frac{1}{\sqrt{3}}$ times the length of a corresponding division on the scale of plate 47. Furthermore, scale plate 48 is arranged to indicate a value which is proportional to the difference between the readings indicated on scales 42 and 45. Thus, for unity power factor loads, both scales 42 and 45 will register the same and pointer 51 will stay at the zero point of scale plate 48 although both will be moved downward from the position shown. For .5 power factor lagging the two instruments will preferably be connected so that the lower one will show no deflection, whereby that part of the scale on plate 48 above the zero point will register reactive component and that part below the zero point will register capacity component.

The arrangement shown is not suitable for power factors below .5 since in that case the lower instrument will tend to give a reverse indication. If it is desired to go below .5 power factor, the zero position of the scales 42 and 45 will preferably be located near the middle of the scale and the instrument pointers arranged to deflect both ways from a zero position. The pointers and scales of the single phase meter element are of course unnecessary but have been illustrated for the sake of explanation. The pulleys have been illustrated as having a constant radius, but it will be understood that the radii of the pulleys may be varied from point to point in a manner to meet the requirements of the deflection constants of the instruments.

In the foregoing description, my instrument has been described as connected to measure to line voltage and current of a three-phase system. The same type of instrument may be connected, however, to measure the star voltage and line current or the delta current and line voltage; for example, by providing an artificial neutral and connecting the potentials coils of the instruments between this neutral and their respective lines as represented in Fig. 3, one wattmeter $P'_1$ will measure $\sqrt{3}E'I \cos(30+\phi)$ and the other $P'_2$ will measure $\sqrt{3}E'I \cos(30-\phi)$ where $E'$ is the voltage between the neutral point and the line, $I$ the line current, and $\cos \phi$ the power factor.

$$P'_1 + P'_2 = \sqrt{3}E'I \cos \phi \quad (III)$$

and $$P'_2 - P'_1 = \sqrt{3}E'I \sin \phi \quad (IV)$$

Equation (III) gives the true power multiplied by $\sqrt{3}$ while equation (IV) gives the true reactive component. Equations (I) and (II) bear the same relation to each other as equations (III) and (IV) so that the only change in the instrument required for the different connection is a change in calibration which may be accomplished by reducing the gear ratio between the meters and registers in Fig. 1 by $\sqrt{3}$ and by substituting different scales on plates 47 and 48 in Fig. 2.

It will be evident that my improved instrument is much less expensive than a polyphase wattmeter and a polyphase wattless component meter heretofore used for obtaining some of the results obtained by my instrument. It will also be noted that in Fig. 1 the differentials serve, in addition to their other functions, to reduce the speed relation between the meters and registers, something which is required in all integrating types of instruments, so that the cost of such an instrument will be little more than the cost of one ordinary polyphase instrument. Recording attachments such, for example, as those shown in Schuchardt Patent No. 1,366,960, may be added if it is desired to obtain records of the measurements.

In accordance with the provisions of the patent statutes, I have described the principle of operation of my invention together with the apparatus which I now consider to represent the best embodiment thereof; but I desire to have it understood that the apparatus shown in only illustrative and that the invention can be carried out by other means.

What I claim as new and desire to secure by Letters Patent of the United States, is:—

1. An instrument for obtaining the watt and wattless component measurements of a three-phase circuit comprising a pair of single phase wattmeter elements adapted to be connected to the circuit according to the two wattmeter measurement method, differential means for adding their measurements, differential means for simultaneously subtracting their measurements and a pair of registers respectively cooperating with said differential means for registering the values obtained by said differential means in the relation of $\sqrt{3}$ to each other.

2. In combination, a polyphase alternating current circuit, a plurality of single phase wattmeter elements connected to measure like components of the current and voltage in different phases of said circuit, differential means operated by said meter elements for simultaneously obtaining measurements proportional to the total watt component and the total wattless component of said circuit and registering means operated by said differential means for registering said total components in their true relation to each other.

3. In combination, a substantially balanced three-phase alternating current circuit, a pair of single phase wattmeter elements connected to said circuit according to the two wattmeter measurement method, differential means operated by said meter elements arranged to simultaneously obtain from the meter measurements movements proportional to the total watt and the total wattless component of said circuit and registering means for registering said movements in terms of total watt component and total wattless component.

4. An instrument comprising a pair of single phase wattmeter elements of the integrating type, a differential operated by said meters for adding their integrations, a differential operated by said meters for subtracting their integrations and registers respectively operated by said differentials for registering values proportional to the sum and difference of the meter integrations.

5. An instrument comprising a pair of integrating type meter elements, a pair of differentials operated by said meters, one arranged to add the integrations of said meter elements and the other arranged to subtract the integrations of said meter elements, and a pair of registers driven by said meter elements through said differentials in a different but constant speed relation for registering quantities respectively proportional to the sum and difference of said meter integrations.

6. In combination, a three-phase alternating current circuit, a pair of single phase integrating type wattmeter elements connected to said circuit according to the two wattmeter measuring method, a differential driven by said meter elements and arranged to algebraically add the integrations of said meter elements, a differential driven by said meter elements and arranged to algebraically subtract the integrations of said meter elements, a register calibrated in watt hours driven by the first mentioned differential and a register calibrated in wattless component hours driven by said second mentioned differential.

7. In combination, a polyphase alternating current circuit, a pair of single phase wattmeters connected thereto, so as to measure by their difference a quantity proportional to the total wattless component of said circuit, differential means operated by said meters for algebraically subtracting the simultaneous measurements of said meters and a register calibrated in wattless component units operated by said differential, the operation of said parts being such as to distinguish between capacitive and reactive wattless component.

8. In combination, a polyphase alternating current circuit, a pair of single phase wattmeters, elements of the integrating type connected to said circuit so that the difference in their simultaneous integrations is proportional to the total wattless component of said circuit, a differential operated by said meter elements for algebraically subtracting the integrations of said meter elements and a register driven by said differential calibrated in wattless component hours, the operative relation of said parts being such as to cause the register to be operated in opposite directions by reactive and capacitive wattless component integrations.

9. A combination as claimed in claim 8, provided with means for obtaining the maximum demand of only one type of the wattless component integrations.

10. An electric measuring instrument comprising a pair of integrating type meter elements, a differential driven jointly by said meter elements in a manner to algebraically subtract their respective integrations, a register operated by said differential for registering a quantity proportional to the difference between the aggregate plus and the minus differences of said wattmeter integrations and a separate register operated by said differential for registering a quantity proportional to one of said last mentioned differences only.

11. In combination, a polyphase alternating current circuit, a pair of single phase integrating type wattmeter elements connected to said circuit so as to measure by the difference in their integrations a quantity which is proportional to the wattless component of said circuit, a differential driven by said meters in a manner to algebraically subtract the respective integrations of said meters and to distinguish between capacitive component integrations and reactive component integrations, an integrating register calibrated in reactive component units arranged to be operated by said differential irrespective of whether the integrations are reactive or capacitive and an integrating register calibrated in capacitive component units arranged to be operated by said differential only when the meter integrations are capacitive.

12. In combination, a polyphase alternating current circuit, an electric measuring instrument comprising a plurality of single phase wattmeter elements connected to said circuit so as to measure by the algebraic sum of their individual measurements a quantity proportional to the total watt component when the circuit is balanced and so as to increase the measurement when the circuit becomes unbalanced in a predetermined manner, means for algebraically adding the individual measurements of said meter elements and a register operated by said means and calibrated to register the total watt component when said circuit is balanced.

13. In combination, an alternating current circuit, an electric measuring instrument comprising a plurality of single phase wattmeter elements connected to said circuit in such a manner as to measure by the algebraic difference in their individual measurements a quantity which is proportional to the total wattless component of said circuit when the circuit is balanced and to increase said measurement when the circuit is unbalanced in a predetermined manner, means for algebraically subtracting the differences in the individual readings of said meters and a register operated by said means and calibrated to register the total wattless component when said circuit is balanced.

14. A polyphase alternating current circuit, a meter for measuring the watt component of said circuit, registering means operated by said meter for separately and simultaneously registering the power and wattless components of said circuit when the circuit is balanced and for increasing the registrations above their true values when the circuit becomes unbalanced in a predetermined manner.

15. An alternating current circuit, a meter for measuring a component of the power flowing in said circuit, means operated by said meter for registering the true value of the component measured when the circuit is balanced and for increasing the registration above its true value when the circuit is unbalance in a predetermined manner.

16. A wattmeter for measuring the power component of an alternating current circuit, means operated by said wattmeter when connected to measure the power component of said circuit, for registering the capacitance component of the circuit metered thereby, and means operated by said wattmeter as thus connected for registering the inductance component of the circuit metered thereby.

17. An alternating current meter for measuring the watt component of an alternating current circuit and means controlled by said meter for simultaneously registering the watt component and wattless component of the circuit metered thereby.

18. An alternating current meter for measuring the watt component of an alternating current circuit and means controlled by said meter when measuring the watt component for registering the wattless component of the circuit metered thereby.

19. An alternating current meter of the integrating type for measuring the watt component of the energy flowing in an alternating current circuit, means controlled by said meter when measuring the watt component for separately registering the watt component and the wattless component of the energy flowing in the circuit metered thereby.

20. A polyphase wattmeter for alternating current circuits and means controlled by said meter for simultaneously and separately registering the watt and wattless component of the circuit metered thereby.

21. A polyphase wattmeter comprising a plurality of single phase wattmeter elements and means controlled by said meter elements when connected to measure the watt component of a circuit for registering the total wattless component of the circuit metered by said wattmeter.

22. A polyphase wattmeter comprising a plurality of single phase wattmeter elements and means controlled by the joint action of said elements for simultaneously and separately registering the total watt and wattless component of a polyphase circuit metered by said wattmeter.

23. A metering device comprising means for measuring the individual watt components of separate phases of a polyphase alternating current circuit and means controlled by said measuring means for simultaneously registering the total watt component and the total wattless component of the phases metered.

In witness whereof, I have hereunto set my hand this 6th day of September, 1923.

RUSSELL A. WARNER.